United States Patent [19]
Bavard et al.

[11] Patent Number: 5,170,116
[45] Date of Patent: Dec. 8, 1992

[54] METHOD AND DEVICE FOR MAGNETIC FLUX ESTIMATION IN AN ASYNCHRONOUS ELECTRIC MOTOR FOR CONTROL THEREOF BY MAGNETIC FLUX REGULATION

[75] Inventors: Jean Bavard, Lyons; Liming Wei, Villeurbanne, both of France

[73] Assignee: GEC Alsthom SA, Paris, France

[21] Appl. No.: 739,031

[22] Filed: Aug. 1, 1991

[30] Foreign Application Priority Data

Aug. 1, 1990 [FR] France ................... 90 09848

[51] Int. Cl.$^5$ ............... G01R 31/34; H02P 5/28
[52] U.S. Cl. ............... 324/158 MG; 318/798
[58] Field of Search ........... 324/158 MG, 545; 318/798, 800, 805

[56] References Cited

U.S. PATENT DOCUMENTS

| | | | |
|---|---|---|---|
| 4,245,181 | 1/1981 | Plunkett | 324/158 MG |
| 4,431,957 | 2/1984 | Chausse et al. | 318/805 |
| 4,470,000 | 9/1984 | Heinle | 318/805 |
| 4,626,761 | 12/1986 | Blaschke | 324/158 MG |
| 4,724,373 | 2/1988 | Lipo | 318/805 |
| 4,967,135 | 10/1990 | Ashikaga et al. | 318/798 |

FOREIGN PATENT DOCUMENTS 0335180 10/1989 European Pat. Off. .

Primary Examiner—Ernest F. Karlsen
Attorney, Agent, or Firm—Sughrue, Mion, Zinn, Macpeak & Seas

[57] ABSTRACT

A method and device are provided for estimating the magnetic induction flux of an asynchronous electric motor, notably for enabling said motor to be controlled by magnetic induction flux regulation, the method consisting of measuring the motor voltage and current, calculating a flux, defining a measured flux, using the operating equations for said motor and employing said measured values and predetermined values for characteristic parameters of said motor, one of which at least, being fixed arbitrarily, may differ considerably from the actual value thereof, and on the basis of said measured flux, calculating a flux defined as the estimated flux and which can be identified with the actual flux through the use of an expression deduced from said motor operating equations as a function of said measured flux, and from characteristic parameters of said motor other than said parameter having a arbitrarily fixed value which may differ considerably from said actual value, and if necessary from said voltage or current measurements.

7 Claims, 1 Drawing Sheet

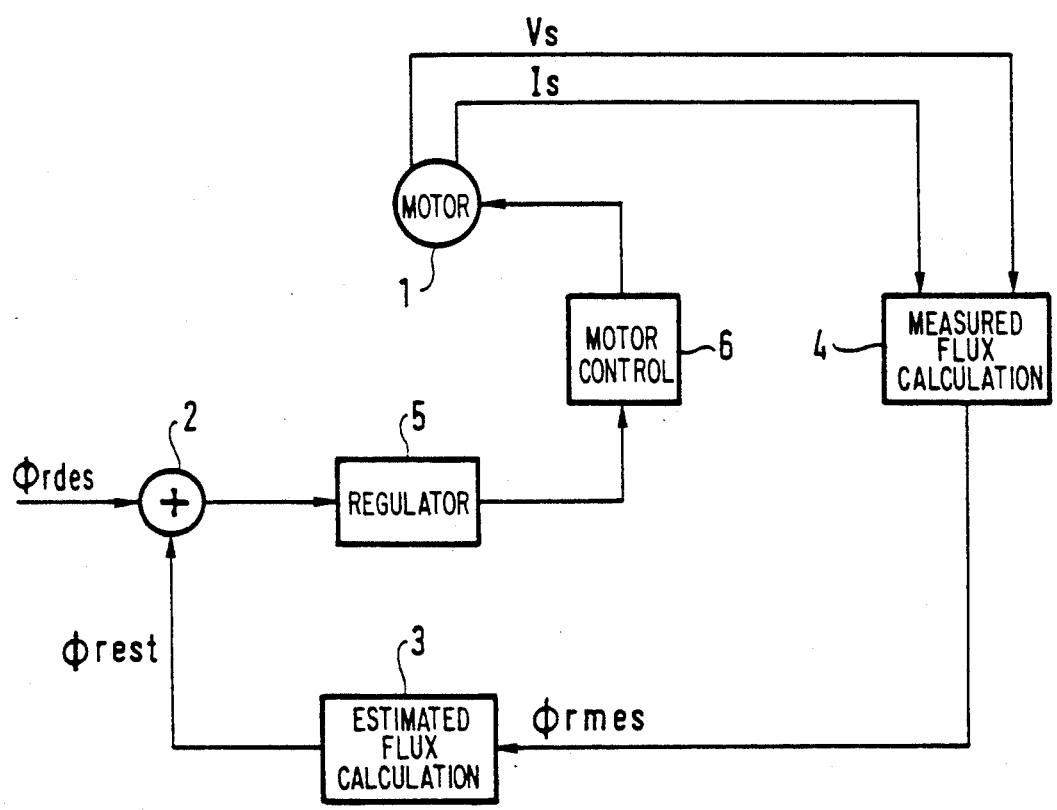

METHOD AND DEVICE FOR MAGNETIC FLUX ESTIMATION IN AN ASYNCHRONOUS ELECTRIC MOTOR FOR CONTROL THEREOF BY MAGNETIC FLUX REGULATION

BACKGROUND OF THE INVENTION

The present invention relates to a method and device for stator, air gap or rotor magnetic flux estimation in an asynchronous motor, particularly for enabling said motor to be controlled by flux regulation.

Asynchronous motor control achieved by flux variation under the control of a desired value thereof is known.

Such control requires measurement of the flux, for example the flux in the rotor, which to date is achieved either by providing additional turns on the rotor and then deducing the flux on the basis of the voltage observed at the terminals of the turns, or by measuring stator voltage and current and then deducing the flux from the measurements and from parameters that are characteristic of the motor, using equations that define the operation of the motor.

The first of these methods suffers from the disadvantage of, apart from the practical problems that arise in carrying it out, its lack of reliability due to the fact that the flux sensor, which is directly fitted into the motor, is subject to a relatively aggressive environment, as regards temperature, humidity, pollution, vibrations, sudden shock, etc.

The second method suffers from the disadvantage that its reliability can be affected by variation in one at least of the said characteristic parameters of the motor, as a function of its thermal status, the parameter most likely to be affected being the stator resistance.

One way of avoiding this disadvantage is to fit a temperature sensor inside the motor but when this is done the same disadvantages as in the first of the above methods are again encountered.

The present invention sets out to provide a method and device for controlling an asynchronous motor by flux regulation that avoids the above disadvantages.

SUMMARY OF THE INVENTION

The invention provides a method for estimating the magnetic induction flux of an asynchronous electric motor, notably for enabling said motor to be controlled by magnetic induction flux regulation comprising the operations of measuring the motor voltage and current, calculating a flux defined as measured flux, using the operating equations for said motor and employing said measured values and predetermined values for characteristic parameters of said motor, one of which at least, being fixed arbitrarily, may differ considerably from the actual value thereof, on the basis of said measured flux, calculating a flux defined as the estimated flux and which can be identified with the actual flux employing an expression deduced from said motor operating equations as a function of said measured flux, and from characteristic parameters of said motor other than said parameter having a arbitrarily fixed value which may differ considerably from said actual value, and possibly from said voltage or current measurement.

Other objects and features of the invention will become more clear from the examples that follows of some embodiments, in conjunction with the attached drawing.

BRIEF DESCRIPTION OF THE DRAWING

The drawing provides a block diagram illustrating one possible application of the method according to the invention to asynchronous motor control using rotor flux regulation.

DETAILED DESCRIPTION OF PREFERRED EMBODIMENTS

Two examples of methods for carrying out the invention will be described, taking estimation of rotor flux as an example of flux estimation, the measured voltages and currents being stator voltage and current, and the parameter with a predetermined value that can widely differ from the actual value being stator resistance. The difference between the examples lies in the method used for calculating estimated flux.

The measured stator voltage and current are designated by $V_S$ and $I_S$ respectively. Measurement is carried out using conventional means that will not be described here.

It will be recalled that the vector equation that defines the operation of an asynchronous motor and relates the vectors $\bar{I}_S$ and $\bar{V}_S$ with the actual rotor flux vector $\phi r$ of a motor is as follows:

$$\Phi_r = \frac{L_r}{L_m} (\int \bar{V}_s dt - \int R_S \bar{I}_S dt - \sigma L_S \bar{I}_S) \quad (1)$$

in which:

$L_r$ is the cyclic inductance of the rotor
$L_m$ is the cyclic mutual inductance between stator and rotor
$R_S$ is the motor's stator resistance per phase
$L_S$ is the cyclic inductance of the stator
$\sigma$ is the leakage factor $(\sigma = 1 - Lm^2 / (L_r L_s)$ The measured rotor flux $\phi_{rmes}$ is defined by:

$$\bar{\phi}_{rmes} = \frac{L_r^*}{L_m^*} (V_s dt - R_S^* \bar{I}_S dt - \sigma^* L_S^* \bar{I}_S) \quad (2)$$

in which the * symbol means that the values of the corresponding parameters are predetermined values that may differ from actual values depending on the operating point of the motor, which, in the case of the parameters $L_r^*$, $L_m^*$, $\sigma^*$ and $L_S^*$ remain very close to these actual values but which may, on the other hand, differ very significantly from these values: in the case of parameter $R_S$ for example, there can be a variation of a factor of 2 for a given operating temperature range of said motor.

This measured rotor flux is calculated using conventional calculating means which it is unnecessary to describe here.

According to the invention, this measured flux is used to calculate a flux value which we call the estimated flux, by the use of an expression deduced from equations for the motor's operation as a function of the measured flux, from parameters that are characteristic of the motor other than its stator resistance and optionally from motor voltage or current measurements.

We shall now describe a first method for obtaining this expression, for a value of $R_S^*$ which may or may not be zero.

In equation (2), the voltage $V_s$ is replaced by its expression given by equation (1).

We obtain:

$$\Phi_{rmes} = \frac{L_r^*}{L_m^*}\left(\int \Delta R_s \overline{I_s} dt + \Delta\sigma L_s \overline{I_s} + \frac{L_m}{L_r}\overline{\Phi_r}\right) \quad (3)$$

in which $$\Delta R_s = R_s - R_s^*$$

$$\Delta \sigma L_x = \sigma L_s - \sigma^* L_s^*$$

giving, under steady operating conditions:

$$\overline{\Phi}_{rmes} = \frac{L_r^*}{L_m^*}\left(-\frac{\Delta R_S}{w_S}j\overline{I_S} + \Delta\sigma L_S \overline{I_S} + \frac{L_m}{L_r}\overline{\Phi_r}\right) \quad (4)$$

where $w_S$ is the angular frequency of the stator supply.

By carrying out a scalar multiplication by $I_s$, the term $$-\frac{\Delta R_S}{W_S}j\overline{I_S}$$

can be made to disappear and we obtain:

$$\overline{\Phi}_{rmes} \cdot \overline{I_S} = \frac{L_r^*}{L_m^*}\left(\Delta\sigma L_S I_S^2 + \frac{L_m}{L_r}\overline{\Phi_r}\cdot\overline{I_S}\right) \quad (5)$$

Let $I_d$ and $I_m$ be respectively the projections of $I_S$ along the vectors $\overline{\phi}_{rmes}$ and $\overline{\phi}_r$, in other words the components of $I_S$ along the direct axis of reference points respectively linked to measured rotor flux $\Phi_{rmes}$ and actual rotor flux $\Phi_r$.

It is known, from the motor operating equations, that at a reference point that is linked to actual rotor flux, the component $I_m$ is expressed in the following manner:

$$I_m = \frac{(1 + T_r p)\phi_r}{L_m} \quad (6)$$

in which p designates the Laplace differential operator and $T_r$ is the rotor time constant, where $$T_r = \frac{L_r}{R_r}$$

Equation (5) can now be written:

$$\Phi_{rmes} \cdot I_d = \frac{L_r^*}{L_m^*}\left(\Delta\sigma L_S I_S^2 + \frac{(1 + T_r p)\phi_r^2}{L_r}\right) \quad (7)$$

giving:

$$\phi_r = \sqrt{\frac{\left(\phi_{rmes}\cdot I_d - \frac{L_r^*}{L_m^*}\Delta\sigma L_S I_S^2\right)L_m^* L_r}{L_r^*(1 + T_r p)}} \quad (8)$$

Taking into account of the fact that $\Delta\sigma L_s$ is approximately equal to zero, and that $L_r^*$ is approximately equal to $L_r$ and $L_m^*$ is approximately equal to $L_m$, an estimated rotor flux $\Phi_{rest}$ is obtained which is close to the actual flux $\Phi_r$, and is defined by the expression:

$$\Phi_{rest} = \sqrt{\frac{\Phi_{rmes}\cdot I_d \cdot L_m}{1 + T_r p}} \quad (9)$$

this being an expression in which only measured flux $\Phi_{rmes}$, and determinable magnitudes $I_d$, $L_m$ and $T_r$ that are characteristic of the motor, excluding resistance $R_S$, occur.

We now consider a second method of obtaining the expression for estimated flux, corresponding to a value $R_S^*$ of zero.

Here, the vectorial expression for $\Phi_{rmes}$ is as follows:

$$\Phi_{rmes} = \frac{L_r^*}{L_m^*}\left(\int \overline{V_s} dt - \sigma^* L_s^* \overline{I_s}\right) \quad (10)$$

At a reference point that is linked to vector $\Phi_{rmes}$, the latter equation can be written as:

$$\Phi_{rmes} = \frac{L_r^*}{L_m}\left(\frac{V_{sq}}{w_S} - \sigma^* L_S^* I_{sd}\right) \quad (11)$$

in which $I_{Sd}$ and $V_{sq}$ respectively stand for the stator current component $I_S$ along the direct axis of this reference point and the component of the stator voltage $V_s$ along the quadrature axis.

As the vectors $\overline{\Phi}_{rmes}$ (measured rotor flux) and $\overline{\Phi}_r$ (actual rotor flux) only exhibit slight angular deviation, $V_{Sq}$ and $I_{Sd}$ in the latter expression can be replaced by their expression as a function of actual flux $\Phi_r$ taken from the motor's operating equations, at a reference point linked to actual rotor flux, giving under steady running conditions:

$$V_{Sq} = w_S \phi_r\left(\frac{L_S}{L_m} + g\frac{R_S}{R_r}\frac{L_R}{L_m}\right) \quad (12)$$

$$I_{sd} = \frac{\phi_r}{L_m} \quad (13)$$

in which "g" designates the motor slip.

We now obtain:

$$\phi_{rmes} = \frac{L_r^*}{L_m^*}\frac{L_S}{L_m}\phi_r \cdot \frac{L_r^*}{L_m^*} g \frac{R_S}{R_r}\frac{L_r}{L_m}\phi_r - \sigma^* L_s^* \frac{L_r^*}{L_m^*}\frac{\phi_r}{L_m} \quad (14)$$

or, if we consider that the values $L_r^*$, $L_m^*$, $L_s^*$ and $\sigma^*$ are approximately equal to the respective values $L_r$, $L_m$, $L_s$ and $\sigma$:

$$\phi_{rmes} \simeq \phi_r \frac{L_r L_S}{L_m^2}(1 - \sigma) + g\frac{R_S}{R_r}\frac{L_r^2}{L_m^2}.$$

As $\sigma$ is defined by:

$$\sigma = 1 - \frac{L_m^2}{L_r L_S}$$

we obtain $$\Phi_{rmes} \simeq \phi_r \left(1 + g \frac{R_S}{R_r} \frac{L_r^2}{L_m^2}\right)$$

The estimated flux $\Phi_{rest}$ is then defined as representing a value close to actual flux $\phi r$ by the relation:

$$\Phi_{rest} = \frac{\phi_{rmes}}{1 + g \dfrac{R_S}{R_r} \dfrac{L_r^2}{L_m^2}} \quad (15)$$

It will be noted in this expression for $\Phi_{rest}$ that stator resistance $R_S$ occurs in a fractional relationship with rotor resistance $R_r$. As both of these evolve in the same way during running of the motor, their ratio is practically constant regardless of the motor's operating point.

The same applies to the values $L_r^2$ and $L_m^2$, or to their ratio $L_r^2/L_2^2$, so the latter equation can be written as:

$$\Phi_{rest} = \frac{\Phi_{r\,mes}}{1 + k \cdot g} \quad (16)$$

where "k" is a constant that is uniquely a function of the type of motor. Like in the method for obtaining estimated flux described above, it will be noted that this expression only involves measured flux $\Phi_{rmes}$ and magnitudes that are characteristic of the motor, excluding stator resistance.

By way of example of an application of the method according to the invention, the attached drawing shows a block diagram of a control device for an asynchronous motor 1 in which the motor's rotor flux is controlled on the basis of a desired value $\Phi_{rdes}$.

A difference detector 2 detects possible deviation between the desired value and the value for estimated rotor flux $\Phi_{rest}$ given by a calculating means 3 which employs one of the two methods described above, using a measured flux value $\Phi_{rmes}$ provided, in its turn, by a calculating means 4 operating in a conventional manner using measured values for stator voltage $V_S$ and stator current $I_S$.

Both of the expressions (9) or (16) giving the estimated flux $\Phi_{rest}$ can be calculated by conventional calculating means that hence do not require particular description.

In conventional fashion, the difference detected by difference detector 2 is applied to a regulating means 5, prior to being applied to motor control means 6, which are also of a conventional type.

The method for flux estimation that has been described and applied to this type of control enables a high degree of accuracy to be obtained without encountering the practical problems in carrying out the method, which were present in the prior art.

It will be noted that as the amplitudes of stator, air gap and rotor flux are very close, the same principles for calculating an estimated flux value can be employed regardless of which flux is being considered.

What is claimed is:

1. A method of controlling an electric motor in accordance with a level of flux associated with operation of said motor, said motor having operating equations characterizing its operation, said method comprising the steps of providing a control signal representing a desired value of said flux, generating a feedback signal representing an actual value of said flux, comparing the control and feedback signals, and controlling the motor in accordance with results of said comparing step, wherein the step of generating said feedback signal includes the steps of:
   measuring the motor voltage and current;
   calculating a measured flux, using the operating equations for said motor and employing said measured voltage and current values and predetermined values for characteristics parameters of said motor, at least one of said predetermined values being fixed at a value which may differ considerably from the actual value of the corresponding characteristic parameter of said motor, and
   calculating an estimated flux through the use of an expression deduced from said motor operating equations as a function of said measured flux, and from characteristic parameters of said motor other than said at least one parameter, and if necessary from said voltage or current measurements.

2. Method according to claim 1 wherein said measurement of flux consists of measuring the rotor flux of said motor and said measured current and voltage are the stator current and voltage and said parameter having a predetermined value that may differ considerably from its actual value is the stator resistance of said motor.

3. Method according to claim 2, wherein with said predetermined value of stator resistance being set to zero, said expression for estimated rotor flux is obtained by:
   writing, at a reference point related to measured rotor flux, the vectorial equation for the operation of said motor giving estimated flux as a function of stator voltage and current,
   replacing, in said expression, stator voltage and current by an expression thereof that is a function of actual rotor flux and identified with said estimated rotor flux, at a reference point related to actual rotor flux, and
   identifying the thus obtained expression with the determined value for measured flux.

4. Method according to claim 1, wherein said expression for estimated rotor flux $\Phi$ is:

$$\Phi_{est} = \frac{\Phi_{mes}}{1 + k \cdot g}$$

where $\Phi_{mes}$ is the measured flux, g the motor slip and k is a constant that is a function of said motor.

5. Method according to claim 2, wherein with said arbitrarily fixed value for stator resistance being set to zero or not to zero, said expression for estimated rotor flux is obtained by:
   replacing, in the vectorial equation for the operation of said motor giving measured flux as a function of stator voltage and current, said stator voltage by an expression thereof that is a function of actual flux and of stator current in according with this same equation,
   carrying out a scalar multiplication of the expression thus obtained by the stator current, replacing, in the expression thus obtained, the scalar product of actual rotor flux and stator current by the product of actual flux identifying to said estimated rotor flux, and the value of the direct component of said stator current as a function of actual rotor flux at a reference point related to actual rotor flux, and identifying the expression thus obtained with the determined value of measured flux.

6. Method according to claim 1, wherein said expression for estimated flux $\Phi_{est}$ is:

$$\Phi_{est} = \sqrt{\frac{L_m \cdot \Phi_{mes} \cdot I_d}{1 + T_r p}}$$

where $\Phi_{mes}$ is the measured flux, $I_d$ is the direct component of measured stator current at a reference point related to measured rotor flux, $L_m$ is the cyclic mutual inductance between the stator and rotor of said motor, $T_r$ is the time constant of the rotor, and p is the Laplace differential operator.

7. A device for controlling an electric motor in accordance with a level of flux associated with operation of said motor, said motor having operating equations characterizing its operation, said method comprising the steps of providing a control signal representing a desired value of said flux, means for generating a feedback signal representing an actual value of said flux, means for comparing the control and feedback signals, and means for controlling the motor in accordance with results of said comparing step, wherein said means for generating said feedback signal comprises:

means for measuring the motor voltage and current;

means for calculating a measured flux, using the operating equations for said motor and employing said measured voltage and current values and predetermined values for characteristic values being fixed at a value which may differ considerably from the actual value of the corresponding characteristic parameter of said motor; and means for calculating an estimated flux through the use of an expression deduced from said motor operating equations as a function of said measured flux, and from characteristic parameters of said motor other than said at least one parameter, and if necessary from said voltage of current measurements.

* * * * *